O. F. CARLSON.
VALVE GEAR AND CONTROL MECHANISM FOR ENGINES AND THE LIKE.
APPLICATION FILED OCT. 17, 1918.

1,380,092.

Patented May 31, 1921.

Inventor
Oscar F. Carlson
By Brown, Hanson & Boucher
Attorneys

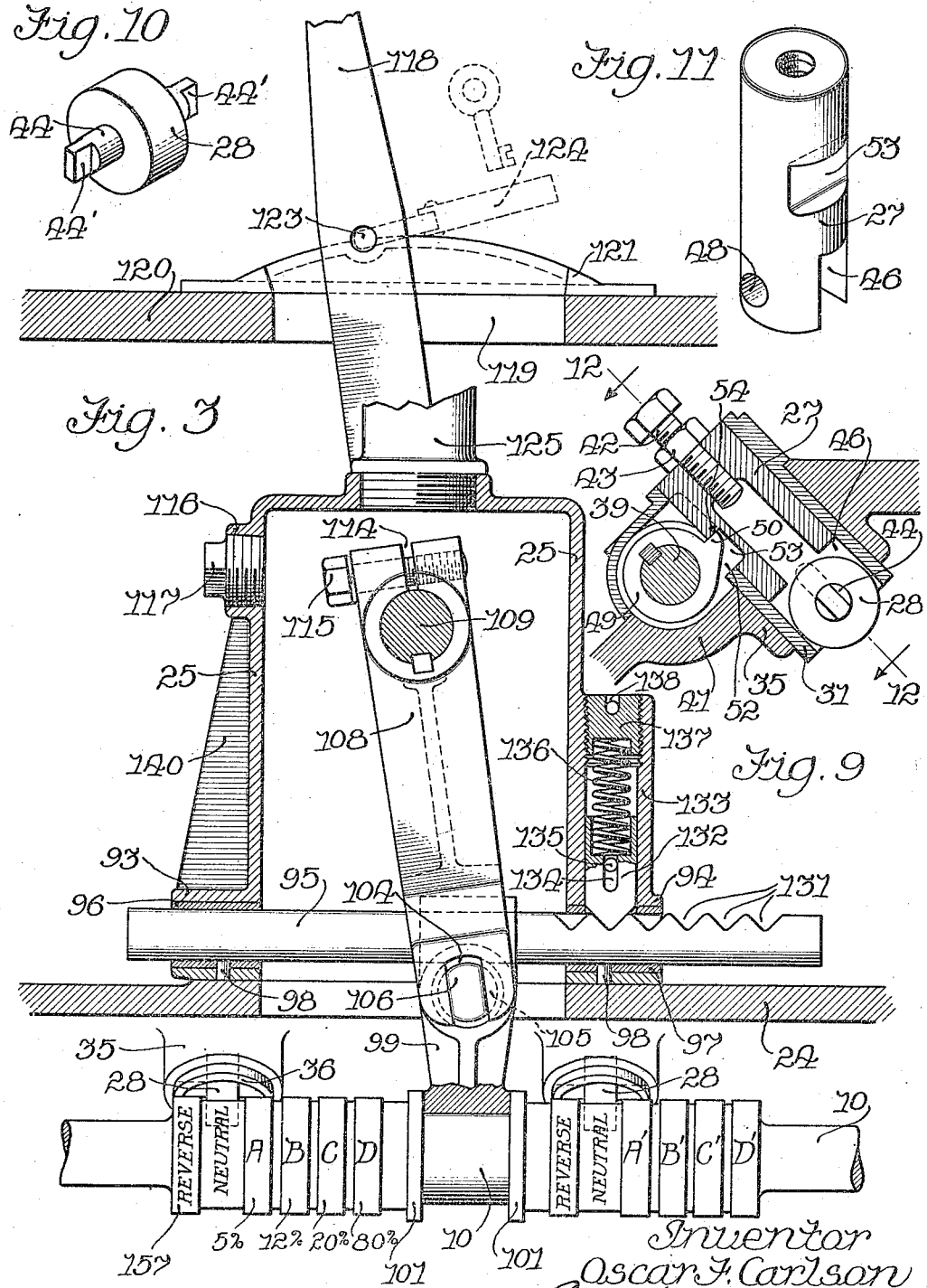

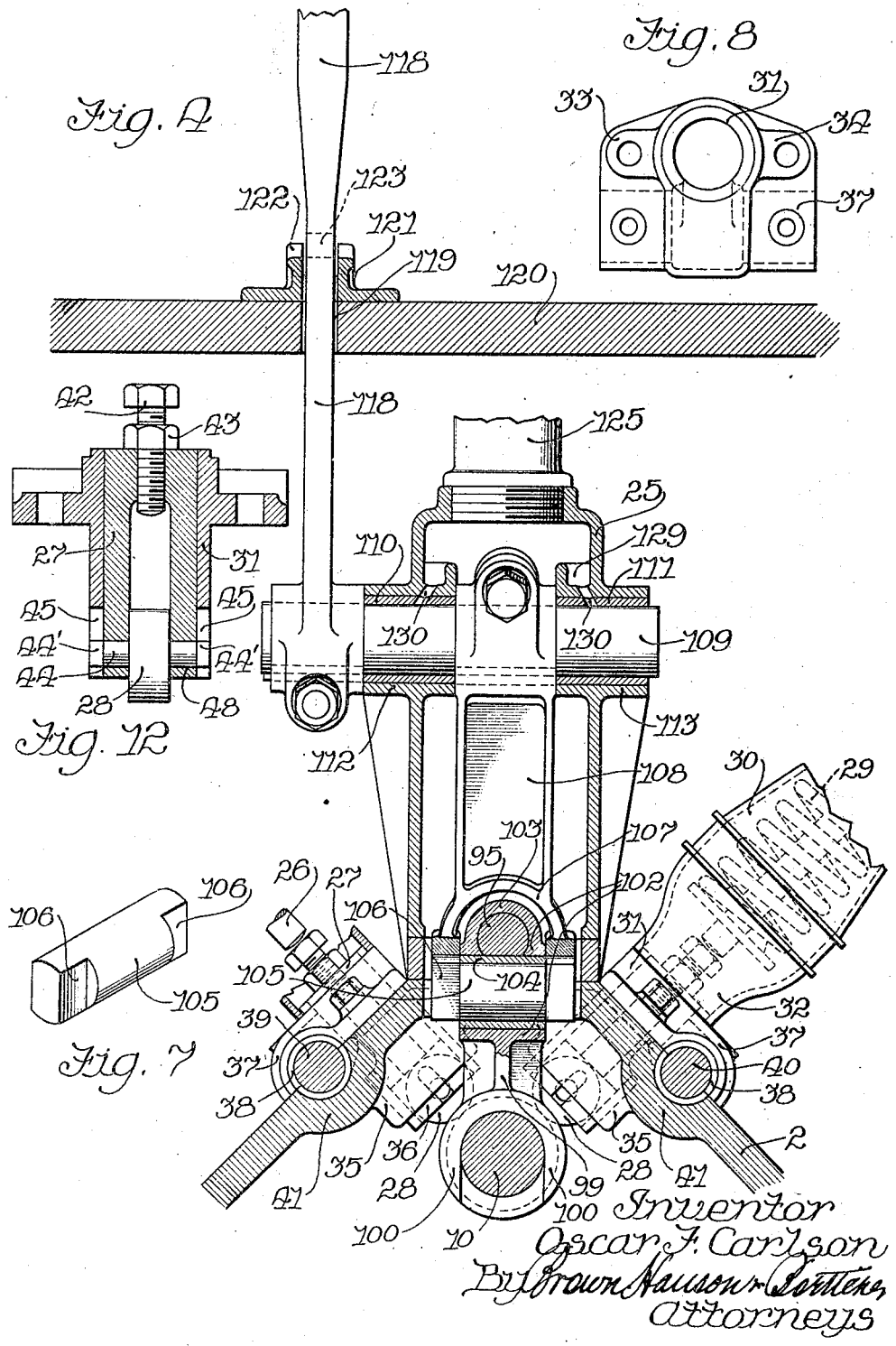

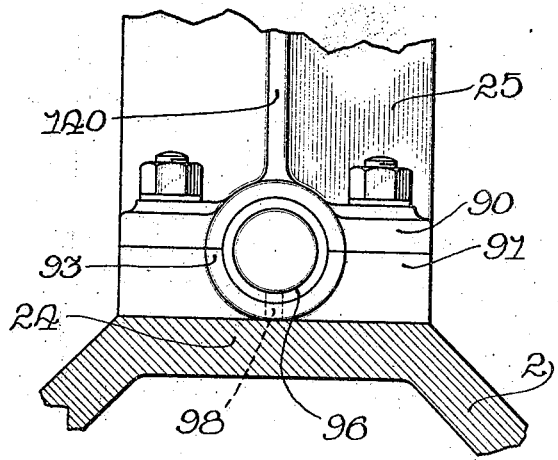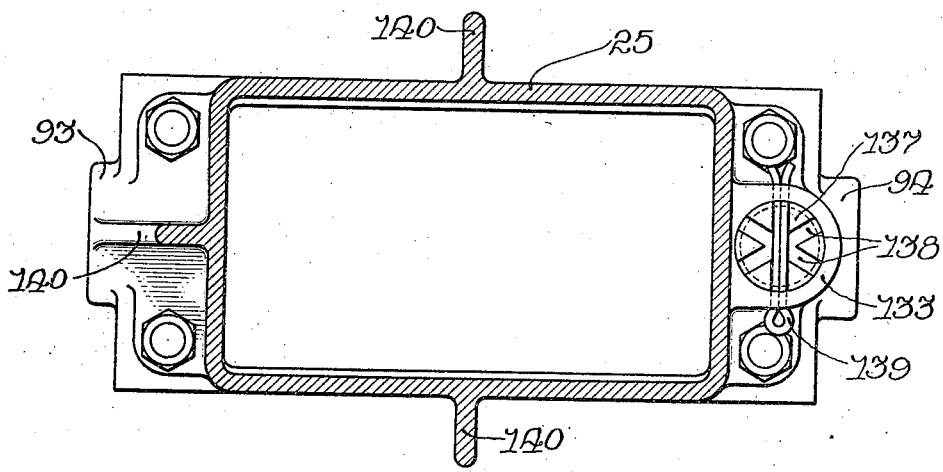

UNITED STATES PATENT OFFICE.

OSCAR F. CARLSON, OF CHICAGO, ILLINOIS.

VALVE-GEAR AND CONTROL MECHANISM FOR ENGINES AND THE LIKE.

1,380,092.   Specification of Letters Patent.   Patented May 31, 1921.

Application filed October 17, 1918. Serial No. 258,660.

*To all whom it may concern:*

Be it known that I, OSCAR F. CARLSON, a citizen of the United States, residing at Chicago, in the county of Cook and State of Illinois, have invented a certain new and useful Improvement in Valve-Gears and Control Mechanism for Engines and the like, of which the following is a full, clear, concise and exact description, reference being had to the accompanying drawings, forming a part of this specification.

My invention relates to valve gear and control mechanism for engines and the like. My invention is particularly adapted to steam engines of the unaflow type. I do not intend to limit the invention to engines of the unaflow type, as it is useful in other types. Neither do I intend to limit the same to steam engines, as it will be apparent that certain features of my invention may be advantageously employed in other fluid expansion or compression apparatus.

The particular embodiment that I have constructed and operated is employed in connection with the power plant of a steam automobile which I have developed and which is illustrated and described more fully in my copending application, Serial Number 330,036, filed October 11, 1919.

The engine of this structure is of the unaflow single-acting, single-expansion, multi-cylinder V-type.

As is well understood by those skilled in the art, the inherent thermal efficiency of a thermo-dynamic engine is controlled by the temperature range or limits between which it works, in accordance with the following equation:

$$\text{Efficiency} = \frac{T_1 - T_0}{T_1}$$

I provide a power plant operating on a steam pressure of the order of 600 lbs. per square inch to secure high inherent efficiency.

The power delivered by the engine is controlled by varying the cut-off and by manipulating the throttle. To provide a suitable throttle valve for fluid of this pressure I have found it necessary to develop a throttle valve of improved design as disclosed and claimed in my co-pending application, Serial Number 258748, filed October 18, 1918.

The present application relates more particularly to the admission or cut-off valve mechanism, the control for the same, and the mechanism for inter-related control of the admission or cut-off mechanism and the throttle mechanism.

The chief object of this invention is the provision of improved cut-off valves and control mechanism for engines. The particular object is the provision of improved cut-off valve mechanism suitable for vehicle engines of the type above described. Another object is the provision of mechanism for the inter-related control of throttle and admission valves, whereby the throttle valve is closed when the admission valves are unseated during the time the cut-off is changed.

In the accompanying drawings which form a part of the present specification I have illustrated an embodiment of my invention.

Fig. 3 is a vertical section through the floor of the vehicle, the casing of the control mechanism and the engine casing;

Fig. 4 is a vertical section taken at right angles to the section shown in Fig. 3;

Fig. 5 is a fragmentary end view of a portion of the casing as seen from the left of Fig. 4;

Fig. 6 is a horizontal sectional view of the housing for the control lever;

Fig. 7 is an isometric view of the connecting pin between the arm which embraces the cam shaft and the arm of the lever which shifts the same;

Fig. 8 is a plan view of the valve tappet guide;

Fig. 9 is an enlarged vertical section through the valve tappet guide, showing the valve tappet mounted therein;

Fig. 10 is an isometric view of the lifting roller;

Fig. 11 is an isometric view of the valve tappet;

Fig. 12 is a vertical section taken on the line —12—12 of Fig. 9;

Fig. 13 is an isometric view of the bearing plate which supports the outer ends of the cam shaft and tappet lifting shafts.

As it is well understood in the art, the power developed by a given steam engine depends on the quantity of steam admitted for each stroke, and the pressure of the steam admitted.

In the interests of economy it is desired to admit the steam at as high a pressure as is feasible and permit adiabatic expansion from the upper range of pressure to the lower limit of pressure. This I secure by employing a single expansion unaflow engine which expands the steam from 600 lbs. per square inch to atmosphere in the individual cylinder. To do this economically, balanced puppet valves are employed to govern the admission of steam, these puppet valve being operated by cams on a cam shaft. The exhaust is controlled by the piston which opens the port at the end of the stroke, as is well understood by those skilled in the art. In order to control admission, that is the percentage of the stroke during which steam is admitted and at which cut-off occurs, the cams must be changed. I provide a plurality of cams arranged side by side on a cam shaft and provide means for shifting the cam shaft with respect to the cam follower. The cams on the cam shaft are arranged to give different percentages of cut-offs as may be desired.

In order to permit easy shifting of the cam shaft it is necessary to raise the cam followers from the cams in order that shifting of the cam shaft may occur at any stage or period of the revolution of the cam shaft. Thus raising the cam followers, unless means is provided to the contrary, would open the admission valves and permit the cylinders to fill with steam. To guard against this I have interconnected the means for lifting the cam followers with the throttle valve so that when the cam followers are raised to permit shifting of the cut-off, the throttle valve is temporarily closed. This inter-connection is independent of the regular control of the throttle which normally is governed by the operator for controlling the pressure of the steam admitted to the cylinder.

Figure 2:
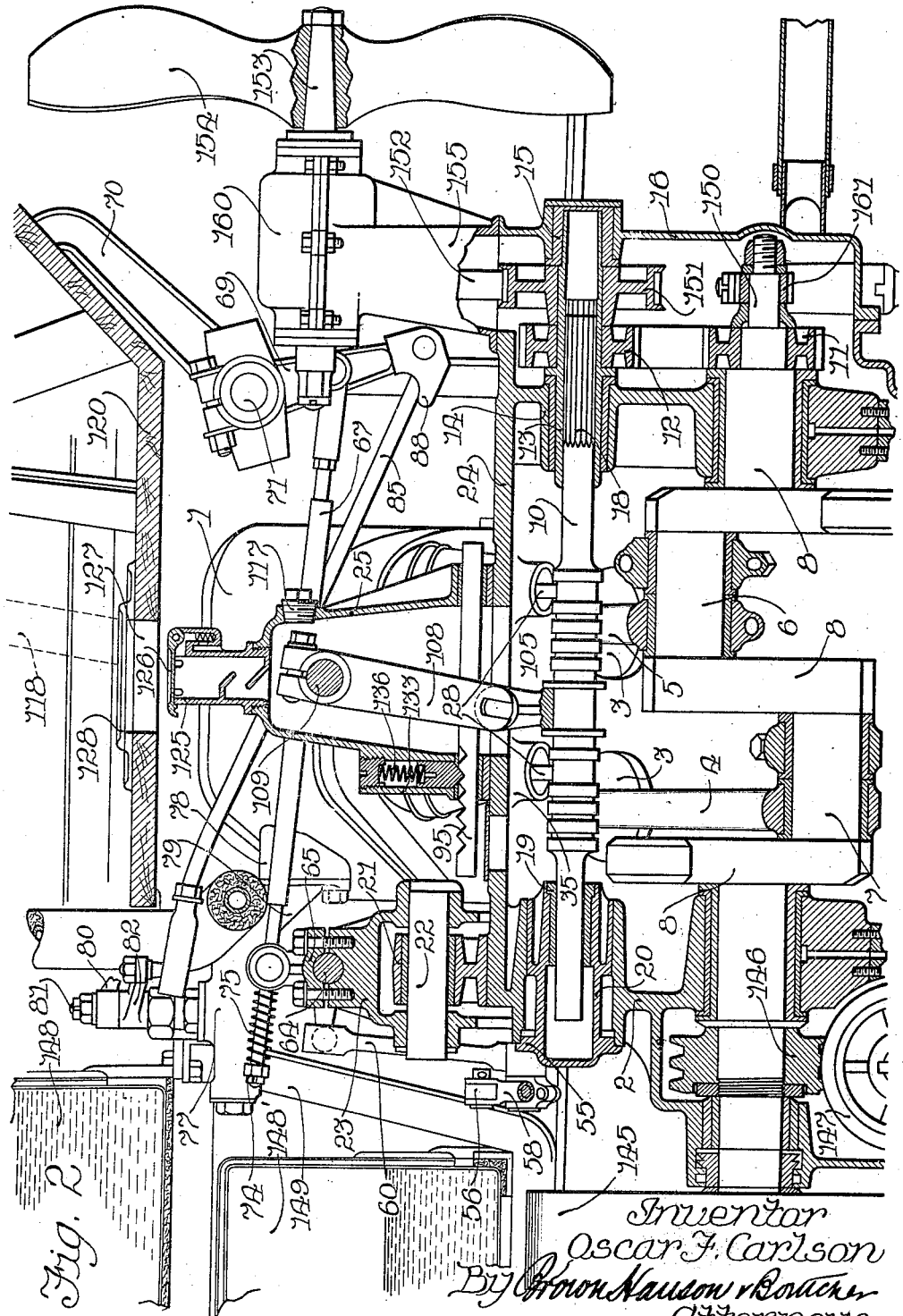
Fig. 2 is a vertical longitudinal cross-section of the engine and vehicle construction embodying the invention.

In Fig. 2, I have shown a fragmentary section of the vehicle and the engine embodying my invention.

The steam engine 1 is of the type having four cylinders, two of which are indicated in the drawings. These cylinders are mounted upon a suitable crank case 2, opening into the same as indicated at 3 to permit the connecting rods 4 and 5 to pass therethrough to the wristpins 6 and 7 of the crank shaft 8. It will be noted that the connecting rods are mounted in pairs upon the wristpins 6 and 7.

The cam shaft 10 is driven in synchronous relation with the crank shaft 8 by means of the gears 11 and 12, which may be connected by an idling gear or by a suitable driving chain or the like. The gear 12 is fastened upon a sleeve 13, which has bearings in the main box 14 secured to the main part of the crank case and also in the box 15 mounted in the supplemental portion 16 of the crank case. The sleeve 13 is internally splined to receive the correspondingly formed end 18 of the cam shaft 10. The other end of the cam shaft 10 is mounted in a bearing 19, secured in a suitable housing 20 connected to the main part of the casing 2. It is to be noted that the cam shaft 10 is thus mounted for rotary movement in synchronism with the crank shaft 8 and for axial movement in accordance with the adjustment desired.

The single cam shaft 10 serves the four cylinders of the engine, which are thus controlled in unison.

The engine 1 is mounted on the frame of the vehicle, as is set out specifically in my copending application, Serial Number 330,036, above set out. The suspension is preferably three point suspension, one of the points being shown in Fig. 2. The upper part of the crank case of the engine has a lug or an enlargement 21, which is bored out to receive the pin 22, that is mounted securely in a transverse frame member 23. The transverse frame member 23 is arched from the one side sill to the other to provide a suitable mounting for the suspension of the engine.

The crank case 2 has its upper walls upon which the engine cylinders are mounted, arranged at an angle of substantially 45° to the horizontal, the two side walls being thereby substantially at right angles to each other. However, the walls do not join at a sharp angle, but join by a flattened portion 24 upon which is seated a housing 25, to be described later.

The cam shaft 10 lies directly below the portion 24 of the crank case 2, being centrally disposed between the cylinders of the engine. Each cylinder is provided with an admission valve having a stem 26 extending down toward the cam shaft 10. Between the end of the valve stem 26 and the cam there is interposed a push rod 27 and roller 28. The valve is held upon its seat by means of a spring 29, as indicated in dotted lines in Fig. 4. A suitable housing 30 covers the spring valve stem and push rod, thereby completely inclosing these parts.

The push rod or tappet 27 slides in a cylindrical housing 31, which guide or housing is connected to the lower section 32 of the housing 30 that incloses the valve stem and the top of the tappet or push rod 27. The guide or housing 31 is provided with flat flanges 33 and 34 upon opposite sides of the bore of the same for clamping the guide to the crank case 2. The crank case 2 is provided with the hollow lugs 35, into which the tappet guide 31 fits closely. The tappet guide 31 also has a semi-circular flange 37 which forms a housing for the bearing sleeves 38 of the adjacent tappet lifting shaft. The crank case 2 is provided with a depression 41, which forms the lower half of the tappet lifting shaft housing.

The tappet 27 comprises a hollow cylindrical pin having a threaded rod or extension in the form of a cap screw 42, threaded into its upper end for adjusting the effective length of the tappet. This extension 42 is locked by means of a lock nut 43, at any desired setting. As the tappet 27 is round it is necessary that the same be guided against rotation, otherwise the roller 28 might get out of line. To guard against this the roller 28 is mounted upon a pin 44 (see Fig. 10) which pin is cylindrical at its central portion and is splayed off to form tenons 44' at each end, these tenons fitting closely in slots 45, formed in the end of the tappet guide 31.

The lower end of the tappet 27 is slotted as shown at 46 in Figs. 9 and 11 to receive the roller 28 and is provided with a transverse hole for the pin 44, this pin fitting snugly in said hole 48. By this arrangement the tappet 27 is guided by the projecting tenons 44', which rest in the guide slots 45 of the tappet guide 31. The rollers 28 are closely guided, not only on the pin 44, but also by the sides of the slot 46 in the tappet 27.

In order to lift the tappet guides against the tension of the spring lift 29, the tappet lifting shafts 39 and 40 are provided with collars 49, keyed to the shaft and having the lifting levers 50 forming part of said collars. The lifting levers 50 are movable within suitable recesses in the enlargement 41 of the crank case 2 and normally project through slots 52 in the tappet guides 31 and into recesses 53 in the tappet 27, to engage shoulders 54, whereby a suitable rotation of the tappet lifting shafts 39 and 40 will raise all of the tappets 27, thereby lifting the rollers 28 off of the cam shaft 10.

The tappet lifting shafts 39 and 40 are mounted at their outer ends in a bearing plate 55, which is secured to a suitable bracket on the end of the crank case 2. A bell crank lever 56 is connected to the lifting shaft 39 and a straight lever arm 57 is connected to the lifting shaft 40 and these two shafts are operated in unison to lift the tappets from the cam shaft 10 for all of the cylinders. The bell crank 56 is connected to the arm 57 by means of the link 58 the arms 56 and 57 being so placed that the shafts 39 and 40 will be rotated in opposite directions. The outer arm 59 of the bell crank lever 56 is connected by a link 60, with another bell crank lever 61, the link 60 connects the lever arms 62 and 59 preferably by means of the ball and socket joints 63 and 63', because of the requirements for permitting play between the engine and the frame 23. The shaft 64, which forms the pivot of the bell crank lever 61 is mounted in the top of the frame member 23 by means of the clamp 65, as shown in Fig. 2. The upper arm 66 of the bell crank lever 61 is connected by a lost motion connection to the rod 67 by means of the pin 68, which is pivoted in the upper end of the arm 66. The rod 67 is connected at its opposite end to the arm 69, controlled by the pedal crank 70.

Figure 1:
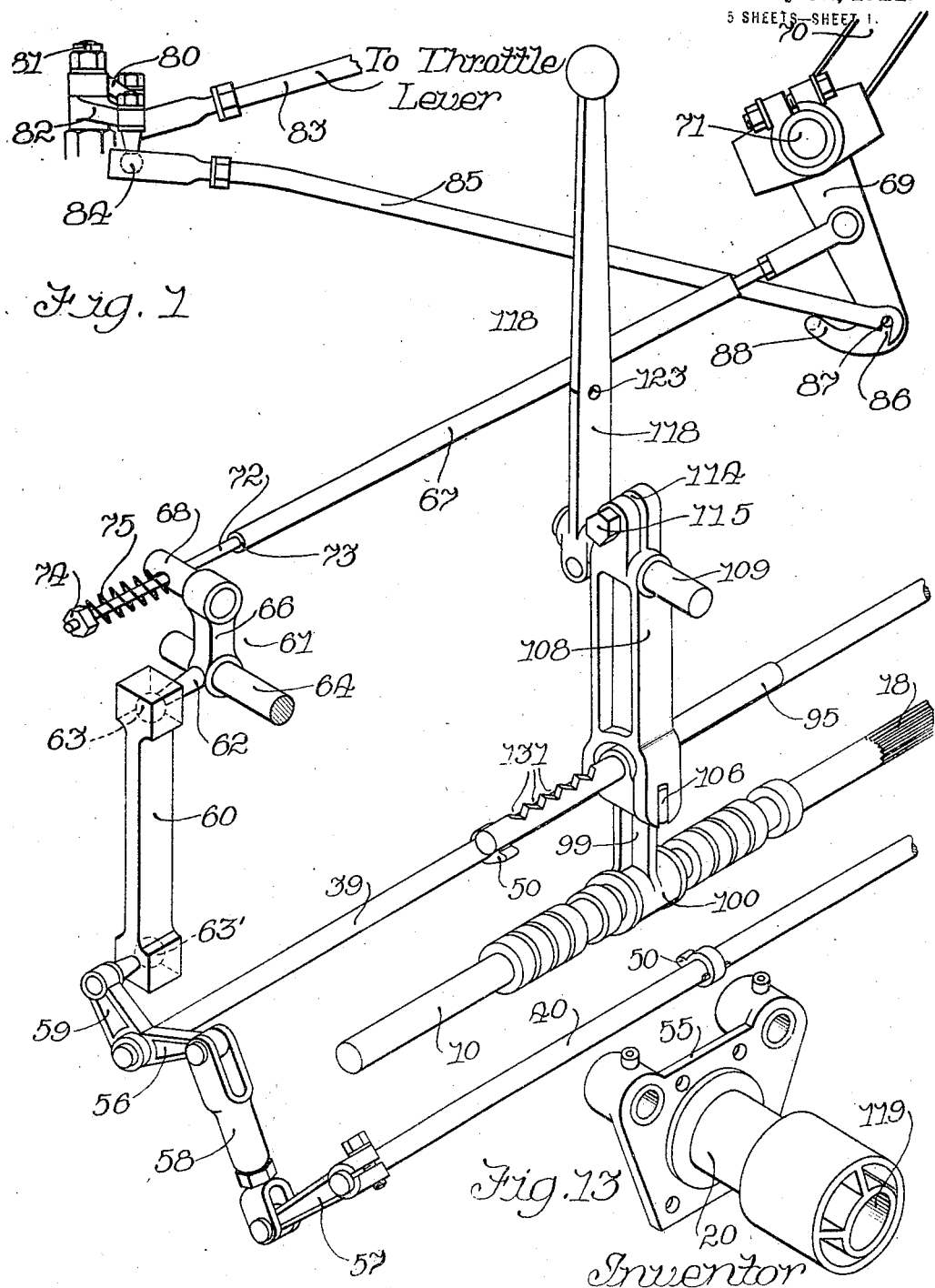
Figure 1 is a diagrammatic or skeleton view of the controls for the cut-off valve mechanism and for the throttle valve mechanism.

The pedal arm 70 is mounted upon a transverse shaft 71, pivoted in the frame of the vehicle and rigidly connected to the arm 69 so that when the pedal is depressed the crank arm 69 will be rotated in a clockwise direction as viewed in Fig. 1 and will move the rod 67 to the left.

The outer end of the rod 67 is reduced in diameter, as shown at 72, and is provided with a shoulder 73 which is adapted to engage the pin 68, in which the reduced portion is slidably mounted. The outer end of the rod 67 carries the head which may consist of a pair of lock nuts 74 between which lock nuts and the pin 68 a compression spring 75 is disposed. The pedal lever 69—70 is controlled by a relatively strong spring which returns the parts to the position shown in Figs. 1 and 2. Thus when the pedal is depressed the first part of the movement of the rod 67 will be idle until the shoulder 73 engages the pin 68, whereupon the bell crank lever 61 will be swung in a counter clockwise direction, as shown in Fig. 1, also moving the bell crank 56 in counter clockwise direction and moving the arm 57 in clockwise direction. Thus the two tappet lifting shafts will be operated in such direction as to cause the lifting arms 50 to raise the tappets, thereby lifting the rollers off of the cams on the cam shaft 10.

As this motion of raising the tappet opens the admission valves, I have provided means for closing the throttle prior to the lifting of the tappet so that there will be no waste of steam.

The throttle valve 77, which is shown and described in greater detail in my co-pending application, Serial Number 258,748, above referred to, is mounted upon a lug 78, formed on the sides of the cylinder castings by means of the bracket 79.

The throttle valve 77 is provided with an operating shaft 81 and a pair of arms 80 and 82 which are adapted to have lost motion connection with each other. The arm 80 is rigidly connected to the operating shaft 81 of the throttle, and this arm is connected by a rod 83 and other suitable connection, to the throttle lever mounted upon the steering wheel of the automobile. The arms 80 and 82 are so related, as is set out in detail in the application above referred to, that movement of the arm 82 to the left in Fig. 1, will engage the arm 80 and bring the throttle to the closed position. The arm 82 is connected by a ball and socket joint 84 through an operating rod 85, which in turn is connected by a releasable connection to the pedal operated arm 69. The rod 85 has a slot 86 at its outer end, as shown at the right of Fig. 1, which normally, when the pedal operated arm 69 is in normal condition, drops over a pin 87 mounted in the lower end of the arm 69. A lateral projection 88 lies under the end of the rod 85 and operates to raise this end of the rod to disengage the slot 86 and the pin 87 after a predetermined amount of motion has been imparted to the throttle arm 82. It is now apparent that when the pedal is depressed the first part of the motion of the pedal operated arm 69 closes the throttle valve 77 and the motion of the arm thereafter operates the tappet lifting shafts 39 and 40 to raise the admission valves so that the tappets are clear of the cams on the cam shaft 10. The cam shaft 10 may then be axially shifted by the mechanism which I shall now describe.

The casing 25 is split near its lower end into two parts 90 and 91, these parts being grooved out at front and rear and forming boxes 93 and 94 for the guiding shaft 95. The boxes 93 and 94 have bushings or bearings 96 and 97, preferably formed of friction-reducing metal and held in place by means of the pins 98.

The guiding rod or shaft 95 is connected to the forked arm 99, which has fork members 100 embracing the central part of the shaft 10 between the collars 101. The forked arm 99 is secured to the shaft 95 by means shown in Fig. 4. The arm 99 has a box 102, which intersects the bore of the box 103, in which the shaft 95 is mounted. The shaft 95 is notched out to permit the bushing 104 to be pressed into the box 102. A bearing pin 105 (see Fig. 7) fits into the bushing 104. This pin has its ends milled out to form the tenons 106, leaving a cylindrical portion between said tenons of the width of the box 102 and the bushing 104. The tenons 106 fit into the slotted ends of the yoke 107 which is formed on the lower end of the lever arm 108. Thus the pin 105 is prevented from axial displacement by the ends of the yoke member 107. The bushing 104 is similarly prevented from displacement by the ends of the yoke member 107. As a consequence, these parts are all secured together without any additional fastening means.

The arm 108 is keyed to the stub-shaft 109, this stub-shaft being mounted in the bushings 110 and 111, mounted in boxes 112 and 113, formed at the upper part of the casing 25. The upper end of the arm 108 is split as shown at 114 and is adapted to be clamped upon the shaft 109 by the bolt 115. This bolt is rendered accessible through an opening 116, normally closed by the plug 117. This construction is provided to facilitate assembly of the parts, inasmuch as the shaft 109 must be introduced axially through the end of the arm 108, by passing the same through one of the bushings 110, or 111. One end of the shaft 109 projects out beyond the casing or housing 25 and is connected to the manual lever 118. This lever 118 passes through a slot 119 in the floor boards 120 of the vehicle, being guided in a suitable guide plate 121, which covers the edges of the slot 119. The guide plate 121 is provided with a depression 122 and the manual lever 118 is provided with an aperture or hole 123 in line with the notch 122 so that the hasp of a padlock may be passed through the aperture 123 to lock the lever 118 with the cams in neutral position. The arrangement is such that the handle 118 extends to a point adjacent the seat of the driver, being in the position usually occupied by the gear shift lever in gasolene propelled cars. In a similar manner the pedal on the pedal lever 70 extends into such position as is usually occupied by the clutch lever in the gasolene engine propelled vehicle.

The upper end of the casing 25 is provided with a breather cap 125 which has a hinged cover 126 permitting the introduction of oil into the crank case of the engine. A suitable opening 127 is formed in the floor boards 120, this opening normally being covered with a cover plate 128, so that lubricating oil may be introduced into the crank case by lifting the cover 128 and opening the hinge cover 126 of the breather cap 125.

The upper end of the housing or case 25 is provided with oil pockets 129 which communicate by way of passages 130 with the bearings of the shaft 109. It can be seen that when oil is introduced into the breather or the filler cap 125, some of the oil will drop into the pockets 129 and thus keep the bearings of the shaft 108 lubricated.

The guiding rod or shaft 95 has a series of notches 131 milled in the upper surface of the same at one end as shown in Fig. 3, these notches being engaged by a pointed spring plunger 132 which is guided in the bore of the hollow lug 133. The plunger 132 is slotted as shown at 134 and is guided upon a pin 135 to secure proper alinement of the plunger and the notches 131. The spring 136 lies between the plunger 132 and the plug 137 which may be adjusted to vary the tension of the spring. The plug 137 is grooved as shown at 138 in Fig. 6 for receiving the cotter pin 139, which passes through a hole in the upper end of the socket or lug 133. The housing 25 is provided with reinforcing ribs 140 along the front and sides.

Certain other features of the engine and automobile mechanism shown in Fig. 2 are novel and are described, illustrated and claimed in other co-pending applications, and I shall mention the same but briefly to make clear the operation of the engine and vehicle mechanism in which the present invention is embodied. The crank shaft 8 is connected to a fly wheel 145 and thence directly to the rear wheels (not shown). The crank shaft 8 has a spiral gear 146 which drives a coöperating gear 147 connected to a pair of pumps (not shown) for supplying feed water to the boiler and for pumping fuel to the burner.

The fuel and water tanks 148 and 148' respectively, are mounted in suitable framework 149 and are placed under the seat of the vehicle.

The front end of the crank shaft 8 has a reduced diameter as shown at 150 upon which a helical gear 161 is connected for driving the circulating pump for lubricating oil.

The driven sleeve 13 has a sprocket wheel 151 which is driven in unison with the cam shaft 10 which sprocket wheel drives through the medium of the chain belt 152 and a sprocket (not shown), the fan shaft 153. The fan 154, which is mounted on the shaft 153 is placed back of the condenser (not shown) for condensing the exhaust steam. The shaft 153 is journaled in a housing 160 which is mounted on a hollow pedestal 155, this pedestal being supported upon the main crank casing 2 and the supplemental casing 16.

The cam shaft end is provided with a plurality of cams for operating the admission valve and is provided with a neutral position in which the cam shaft may rotate without actuating the admission valve.

When the controlling lever 118 is pulled farthest back toward the operator the reverse cam 157 is moved under the cam roller 28.

The cams A—A¹ may be arranged to give 5% cutoff, the cams B—B¹, 12% cutoff, the cams C—C¹, 20% cutoff, and the cams D—D¹ 80% cutoff, or any other values desired may be assigned to these different cams or any desired number of cams may be employed. The above figures or percentages of cutoff are given merely as illustrations of what I have found to be advantageous in practice.

I shall now describe the operation of the engine embodying my invention.

Assume that the parts are in the position shown in Figs. 1 and 3. The tappet rollers 48 are then on the neutral cams and opening or closing of the throttle has no effect, because all of the admission valves are then closed. The engine may be locked to prevent operation by inserting the hasp of a padlock or the like in the hole 123 in the lever 118.

To start the engine the pedal lever 70 is suddenly depressed to operate the tappet lifting shafts 39 and 40 to permit shifting of the cam shaft 10. When the pedal lever 70 is depressed the arm 69, shown in Figs. 1 and 2, will be rotated in a clockwise direction with the result that the first part of the motion of this arms is transmitted through the rod 85 to the throttle controlling arm 82 to close the throttle valve 77. As the arm 69 rotates the nose 88 lifts the rod 85, disengaging the slot 86 in the end of the rod from the pin 87 in the arm. The consequence is that after the throttle 77 is closed the thrust rod 85 is disengaged from the arm 69. At about the point of movement where the thrust rod 85 is disengaged from the arm 69, the thrust rod 67 will have moved in the pin 68 so that the shoulder 73 engages the side of said pin 68, swinging the bell crank lever 61 about its shaft 64. This motion of the bell crank lever 61 is transmitted through the link 60 to the bell crank 56, and thereby to the shaft 39. At the same time motion is transmitted through the link 58 and the arm 57 to the companion shaft 40. Thus the shafts 39 and 40 are rotated in such direction as to cause the tappet lifting arm 50 to raise the tappets 27 against the respective valve stems 26, bringing the rollers 28 clear of the cams on the cam shaft 10.

The lever 118 is then moved to the rear as shown in Fig. 2 until one of the cams such as C is underneath the rollers. It will be noted that the spring plunger 132, which engages the notches 131 in the guiding shaft 95, serves to aid in centering the cam under the rollers. The cam C is chosen if the load is relatively heavy, in order to give a fairly long admission and late cutoff, but if a heavier load is to be started the cutoff may be made still later by employing the cam D.

The throttle valve 77 is thereafter opened by means of a hand lever mounted upon the steering column as described in my co-pending application Serial Number 258,748. It is sufficient to state herein that depression of the pedal lever 70 causes closing of the throttle valve and the lever on the steering column or steering wheel must thereafter be moved in order to open this throttle valve for the admission of steam. When the pedal lever 70 is released the spring 75 rotates the bell crank levers 61 and 56 back to normal, thereby moving the tappet raising arms 51 out of the way.

After the engine is under way and less speed is required to drive the car, the pedal lever 70 is again depressed to close the throttle valve 77 and raise the tappets 27. The lever 118 is then operated to bring the cam B or A under the rollers 28 so that the engine may operate on shorter admissions, using less steam.

The throttle valve is employed very largely to control the speed at any given percentage of cutoff, much in the same way that the throttle valve in a gas engine driven car is employed to govern the speed of the engine.

Similarity of operation of the present mechanism with the controlling mechanism of a gasolene engine driven automobile of the usual type is apparent. The cutoff lever 118 occupies the position and general function of the gear shift lever in the gas car. This lever is in general the means by which the amount of torque applied to the driving wheels is controlled. The throttle lever on the steering column in the present device corresponds to the usual throttle control of the gas car and controls the speed of the engine.

The pedal lever 70 corresponds in location and operation with the clutch pedal lever found in the usual gas car.

I do not intend to be limited to the precise details of construction shown and described.

I claim:

1. In combination, an admission valve, a cam shaft, a plurality of independent separate cams on said cam shaft, said cams being spaced one from the other along said cam shaft, a tappet for engaging the cams on said cam shaft, said tappet being adapted to actuate said admission valve and normally remaining in operative relation to one of said cams, tappet releasing means, means affording a direct mechanical connection between said tappet releasing means and said tappet for moving the latter out of operative relation with said cams, pedal operative means for actuating said tappet releasing means, and manually operable means for selectively shifting said cam shaft to bring the desired cam into operative relation with said tappet.

2. In a steam engine, the combination of an admission valve having a valve stem, a cam shaft, a plurality of independent separate cams on said cam shaft, each of said cams having a flat cam surface and having a square cut-off shoulder alined axially with said cam shaft, said cams being spaced one from the other along said cam shaft, a tappet comprising a tappet roller for engaging the cams on said cam shaft, said tappet normally remaining in operative relation to one of said cams, and being adapted to engage said valve stem, a tappet raising shaft extending adjacent to said tappet, means projecting from said tappet raising shaft and engaging with a shoulder on said tappet for raising the same out of operative relation with said cams, pedal operative means for actuating said tappet raising shaft, and means for axially moving said cam shaft to select the desired cam for operating said admission valve.

3. In combination, a crank case, a pair of cylinders supported on said crank case and arranged at a V angle with respect to each other, admission valves for said cylinders, a cam shaft arranged within said crank case, a plurality of independent cams on said cam shaft, a plurality of tappets extending through said crank case for engaging the cams on said cam shaft, said tappets being adapted to actuate said admission valves, a tappet raising shaft, means mechanically connecting said tappet raising shaft with said tappets whereby motion of said shaft raises said tappets out of the path of said cams, and means for axially shifting said cam shaft to bring the desired cam into coöperative relation with said tappets.

4. In a steam engine, the combination of a crank case, a pair of cylinders mounted on said crank case and arranged at a V angle with respect to each other, a cam shaft in said crank case between said cylinders, a plurality of independent cut-off cams on said cam shaft, admission valves for said cylinders, a pair of tappets extending out through said crank case and adapted for engagement with said cams, each of said tappets being adapted to actuate one of said admission valves, a pair of tappet raising shafts, means for mechanically connecting each of said tappet raising shafts with its respective tappet, means for actuating said raising shafts for simultaneously raising said tappets, and means for axially shifting said cam shaft to bring any desired cam into operative relation with said tappets.

5. In combination, a steam engine comprising a crank case, a pair of cylinders mounted on said crank case and arranged at a V angle with respect to each other, admission valves for said cylinders, having valve stems, a cam shaft arranged within said crank case, means for driving said cam shaft in synchronism with the engine, a plurality of independent cams on said cam shaft, each of said cams having axial cut-off shoulders, a pair of tappets extending out through said crank case and being adapted to actuate said valve stems, both of said tappets adapted for coöperation with the cams on said cam shaft, a pair of tappet raising shafts extending parallel to said cam shaft between said cylinders, bearings supporting said raising shafts adjacent said tappets, means for operatively connecting said tappet raising shafts, pedal operative means for simultaneously rotating both of said shafts, arms extending from said tappet raising shafts and engaging with their respective tappets, and manually operative means for axially shifting said cam shaft to bring the desired cam into operative relation with said tappets.

6. In an engine, a crank case, a pair of cylinders mounted on said crank case at an angle to each other, a common cam shaft in said crank case, valves for said engine cylinders, adapted to be operated by said cam shaft and a substantially vertical control lever mounted on the crank case between said cylinders and intermediate the ends of said crank case for manually shifting said cam shaft axially.

7. In combination, a crank case, cylinders mounted on said crank case at an angle to each other, a crank shaft having bearings in said case, a cam shaft arranged in the case between said cylinders, valve means for the cylinders operated by said cam shaft, means for driving said cam shaft from the crank shaft in synchronism, a control lever mounted on the crank case between said cylinders and forked means connecting said lever with the central part of said cam shaft for shifting said cam shaft with respect to the valves of the cylinders.

8. In combination, a crank case, a main crank shaft arranged in said case, cylinders mounted on said case at an angle to each other, a bearing plate on one end of said case, a sleeve having bearings in the other end of the case, a cam shaft adapted to be shifted axially having driving connection with said sleeve and having a bearing in said bearing plate, means connecting said sleeve with said crank shaft, valves for said cylinders, valve tappet for said valve adapted to be actuated by said cam shaft, lifter shafts mounted in said bearing plate and means operated by said lifter shafts for disengaging said valve tappet from operative relation with the cam shaft.

9. In combination, a crank case, a main crank shaft arranged in said case, cylinders mounted on said case at an angle to each other, a bearing plate on one end of said case, a sleeve having bearings in the other end of the case, a cam shaft adapted to be shifted axially having driving connection with said sleeve and having a bearing in said bearing plate, means connecting said sleeve with said crank shaft, valves for said cylinders, tappet means for said valves adapted to be actuated by said cam shaft, lifter shafts mounted in said bearing plate and means operated by said lifter shaft for disengaging said tappet means from operative relation with the cam shaft, and means for manually shifting said cam shaft axially.

10. In combination, a crank case, cylinders mounted on said crank case at an angle to each other, a bearing plate at one end of the crank case, a cam shaft having a bearing in said bearing plate, said cam shaft being axially shiftable in said bearings, valves for the cylinders, tappets passing through the crank case and serving as connecting means between the crank shaft and the valves, a pair of lifter shafts having bearings in said bearing plate, said lifter shafts being adapted to engage said tappets to raise the same from operative engagement with said cam shaft, means connecting said lifter shafts and pedal operated means for simultaneously actuating both of said lifter shafts.

11. In combination, an engine having an admission valve, a cam shaft having a plurality of cams for operating said admission valve, manual means for selecting the cam to operate said valve, a throttle valve for the engine, a pedal operated member, means connecting said pedal operated member and said throttle valve, means for disengaging the driving connection between the cam shaft and the admission valve and means connecting said pedal operated means with said disengaging means.

12. In combination, an engine having an admission valve, a cam shaft having a plurality of cams for operating said admission valve, means for shifting said cams with respect to the valve, means for disengaging the connection between the valve and the cam shaft, a throttle valve, and pedal operated means for actuating said throttle valve and disengaging means.

13. In combination, an engine having an admission valve, a cam shaft having a plurality of cams for operating said admission valve, said cam shaft being shiftable axially, means for raising the admission valve to disengage the cam shaft, to permit the same to be shifted, a throttle valve for the engine and means for first closing the throttle and then raising the admission valve of the engine to permit the cam shaft to be shifted.

14. In combination an engine having an admission valve, a cam shaft having a plurality of cams thereupon, a tappet between said valve and the cam shaft, an arm for engaging the tappet to raise the same from the cam shaft, manual means for shifting the cam shaft axially to select the desired cam, pedal operated means for actuating the arm for raising the tappet, a throttle valve and means coöperating with said pedal operative means for closing the throttle prior to raising of the tappet.

15. In combination, an engine having a main valve, a cam shaft driving a plurality of cams for operating said valve, an arm for raising the valve to disengage the cam, means for selecting the desired cam, a throttle, and pedal operating means for first closing the throttle and then operating said valve raising means.

16. In combination, an engine having a main valve, a cam shaft having a plurality of cams thereupon for actuating said valve, said cam shaft being shiftable axially to select the desired cam, a valve raising arm, a shaft for said arm, a pedal operated member having connection with said shaft, a throttle valve coöperating with said pedal operated member, a lost motion connection operating on the latter part of the stroke of said pedal operated member to close said throttle valve prior to raising said main valve.

17. In combination, an engine having a main valve, a cam shaft having a plurality of cams thereupon for actuating said valve, said cam shaft being shiftable axially to select the desired cam, a valve raising arm, a shaft for said arm, a pedal operated member, a lost motion connection operating on the latter part of the stroke of said pedal operating member for actuating said shaft to raise the valve, a throttle and a lost motion connection between the throttle and the pedal operated means whereby the throttle is closed on the initial movement of said pedal operated means.

18. In combination, a crank case, a cam shaft mounted in said crank case, a tappet guide passing through said crank case, a tappet mounted in said guide, a lifting shaft adjacent said guide, an arm secured to said shaft, said guide having an opening for said arm, said arm projecting to said opening and engaging said tappet and means for operating the shaft to lift the tappet.

19. In combination, a cam shaft having a plurality of cams, means for shifting said shaft axially, a tappet guide, a shaft having a bearing in said tappet guide, a tappet mounted in said guide, an arm secured to the shaft, said arm being adapted to engage the tappet to raise the same from the cam shaft when the shaft in the tappet guide is operated.

20. In combination, a crank case, a cam shaft mounted in said crank case for axial and rotary movement, said cam shaft having a plurality of cams, tappet guides passing through said crank case, a tappet in said guide, a shaft having bearings in the tappet guide, means for rotating said shaft, an arm passing through the tappet guide and engaging the tappet and means for guiding the tappet in the guide to maintain alinement of same with respect to the cam shaft.

21. In combination, a tappet guide, a tappet in said guide, a roller mounted in said tappet, a pin for the roller, said pin having its ends splayed off to form tenons and said guide having grooves for guiding said tenons, said tenons holding said pin against rotation.

22. In combination, a frame member, a tappet guide mounted in said frame member, said frame member and tappet guide having bearings, a lifting shaft in said bearings, a tappet in said guide, an arm secured to the lifting shaft, said arm passing through the guide and being adapted to engage the tappet, a roller for the tappet, a pin passing through the tappet onto the roller, said pin having extending ends and means in the tappet guide for receiving the ends of said pin.

23. A tappet guide comprising a cylindrical body adapted to receive a cylindrical tappet, said cylindrical body having a recess in the side wall thereof, a box member formed integrally with said cylindrical member, said box member being adapted to receive a bearing for a lifting shaft.

24. In combination, a frame member having a box therein for receiving a bearing and having a bore adjacent said box, a tappet guide member fitting in said bore and having a box member coöperating with the box in the frame member and adapted to provide bearings for a shaft, a shaft in said box member, a tappet in said guide member and an arm on the shaft adapted to engage the tappet member in said guide.

25. In combination, a crank case, a housing mounted on said crank case, a cam shaft in the crank case, a shifting fork for the cam shaft, a guiding rod for the fork, said rod being disposed above said cam shaft and suspending said fork therefrom and a manually controlled lever for shifting said fork and guide rod.

26. In combination a crank case, a cam shaft mounted in said crank case and adapted to be axially shifted, a housing mounted on said crank case, a guide rod, a shifting fork for the cam shaft mounted on the guide rod, means for yieldably holding the guide rod and cam shaft at predetermined positions, and an arm in the housing for shifting said fork, said arm having a forked end engaging over said guide rod and having pivotal connection with said shifting fork.

27. In combination, a crank case, a cam shaft mounted in the crank case and adapted to be axially shifted, a two part housing mounted on said crank case, bearings mounted between the parts of the housing, a guide rod in said bearings, a shifting fork for the cam shaft, a shifting arm secured to the fork and mounted on said guide rod, a pin passing through the arm, said pin having means intersecting the guide rod to hold the arm and the guide rod together and a shifting arm in the housing engaging said pin and holding the pin in place in the guiding arm.

28. In combination, a crank case, a housing mounted on the crank case, a guide rod mounted in the housing for axial movement, said cam shaft being adapted to be shifted axially, means on the housing coöperating with the guide rod for controlling the setting of the cam shaft, a fork for the cam shaft, a guiding arm secured to the fork and mounted on the guide rod, and a pin having a bearing intersecting the guide rod and passing through the guiding arm and means for engaging the pin to shift the arm and the fork.

29. In combination, a crank case, a cam shaft mounted in the crank case, a housing on said crank case, a guide rod in the housing, a rocker shaft at right angles to the guide rod, a shifting arm mounted on the guide rod, a shifting fork for the cam shaft secured to said arm, a transverse pin passing through said arm, a shifting lever secured to said rocker shaft and connected to said pin and a manual lever connected to said rocker shaft for shifting said cam shaft.

30. In combination, a crank case, a housing mounted on the crank case, a cam shaft mounted in the housing, said cam shaft being adapted to be shifted axially, a guide rod mounted on the housing, a guide arm mounted on the guide rod, a fork on the arm for embracing a portion of the cam shaft, a pin passing through the arm and intersecting the guide rod, a locker shaft pivoted in the housing, a lever having a yoke on the end thereof, said yoke having means for embracing the ends of said pin and manual means for operating the rocker shaft.

31. In combination, a crank case, a housing mounted on the crank case, a cam shaft mounted in the housing, said cam shaft being adapted to be shifted axially, a guide rod mounted on the housing, a guide arm mounted on the guide rod, a fork on the arm for embracing a portion of the cam shaft, a pin passing through the arm and intersecting the guide rod, a locker shaft pivoted in the housing, a lever having a yoke on the end thereof, said yoke having means for embracing the ends of said pin and manual means for operating the rocker shaft, and alining means coöperating with the guide rod for alining the cam shaft in predetermined positions.

32. In combination, a crank case, a cam shaft in the crank case adapted to be shifted axially into a plurality of positions, a housing on the crank case, a guide rod mounted in the housing, said guide rod having a plurality of notches, coöperating alining means for the notches, a shifting arm mounted on the guide rod, a pin passing through the arm and intersecting the guide rod, said pin have tenons on the ends thereof, a fork on the end of the shifting arm for engaging a portion of the cam shaft, a shifting lever having a yoke on the end thereof, said yoke have its ends slotted to engage the tenons on the ends of said pin.

33. In combination, a crank case, a cam shaft in the crank case, said crank shaft being adapted to be shifted axially into a plurality of operating positions, a housing on the crank case, a guide rod in said housing, said guide rod being shiftable axially, a shifting arm secured to the guide rod, a transverse pin in the shifting arm, said pin intersecting the guide rod to connect the rod and the arm, a shifting fork on the end of the shifting arm for engaging the portion of the cam shaft, said pin having projecting ends, a rocker shaft pivoted in the housing, a shifting lever secured to the rocker shaft, said shifter lever having a yoke on the end thereof, said yoke having means for engaging the outer end of said pin.

34. In combination, a cam shaft, a housing, a guiding rod mounted in the housing for axial movement, a gear shifting arm secured to the guide rod, a pin passing through the arm and intersecting the guide rod, a fork on the end of the arm for shifting the cam shaft and a shifting lever having means for engaging and holding the end of said pin.

35. In combination a housing, a guide rod mounted in said housing for axial movement, a shifting arm mounted on the guide rod, said shifting arm having a shifting fork on the outer end thereof, a transverse pin passing through the shifting arm, said pin having tenons on its outer ends, a shifting lever having a yoke on the end thereof, said yoke having slots for engaging said tenons and means for operating said lever, said means being pivoted in said housing.

36. In combination, a guide rod, a shifting arm mounted on the guide rod, a transverse pin through the shifting arm, said pin having tenons on its outer end, a bearing for the pins, said bearing intersecting the guide rod, and an operating yoke having slots for engaging the tenons on the pin.

37. In combination, a housing, a rocker shaft in the housing, a guide rod shiftable axially, mounted in said housing, a shifting arm on said guide rod, a transverse pin in the shifting arm, a bearing sleeve about said pin, said sleeve intersecting said guide rod to hold the rod and the arm together, said pin having tenons on the outer ends thereof, a lever mounted on the rocker shaft, said lever having a yoke with slots in the ends of the yoke for engaging the tenons on the end of the pin and for holding the bearings sleeve in place in said arm.

38. In combination, a housing, a rocker shaft in the housing, a guide rod shiftable axially, mounted in said housing, a shifting arm on said guide rod, a transverse pin in the shifting arm, a bearing sleeve about said pin, said sleeve intersecting said guide rod to hold the rod and the arm together, said pin having tenons on the outer ends thereof, a lever mounted in the rocker shaft, said lever having a yoke with slots in the ends of the yoke for engaging the tenon on the end of the pin and for holding the bearing sleeve in place in said arm, and alining means coöperating with the guide rod for holding the rod in a plurality of predetermined positions.

39. In combination, a crank case, a cam shaft mounted in said case, a plurality of tappets mounted on the crank case and adapted to engage with the cams on said cam shaft, a housing mounted from the case, a shifting fork for engaging said cam shaft, a shifting lever pivoted in the housing for controlling said forks, said housing have an aperture in the upper end thereof and a breather cap for said aperture, said housing and said case communicating so that oil may be introduced into the crank case through the lever cap.

In witness whereof I hereunto subscribe my name this 11th day of October, A. D. 1918.

OSCAR F. CARLSON.